June 27, 1961 E. J. DEUTSCH 2,989,981
DELAYED ACTION MECHANISM
Filed May 17, 1957
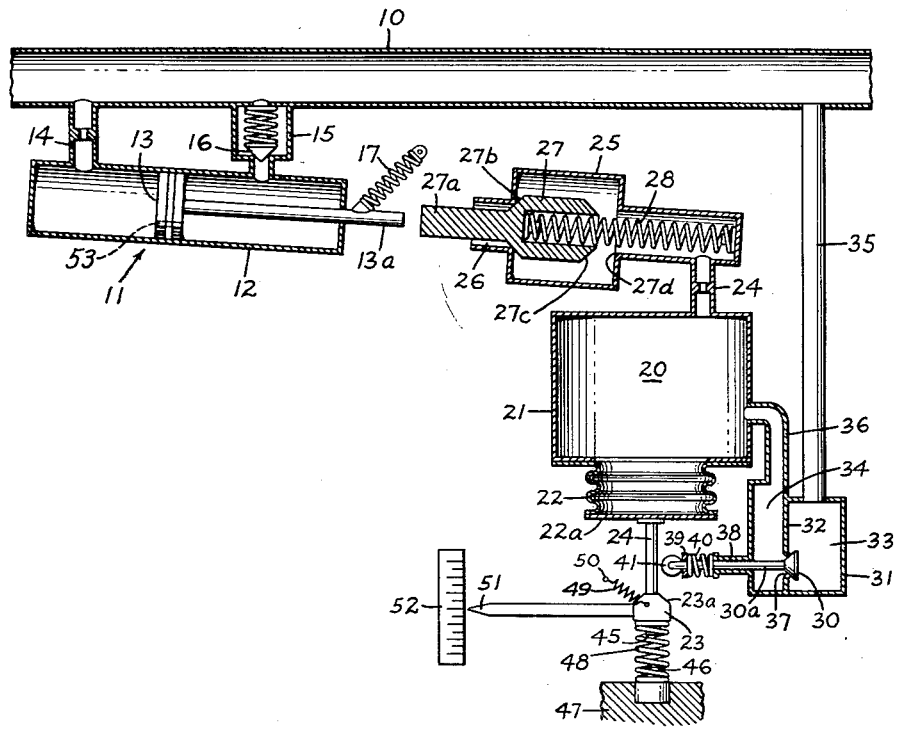
INVENTOR
EDWARD J. DEUTSCH
BY
HIS ATTORNEYS

United States Patent Office 2,989,981
Patented June 27, 1961

2,989,981
DELAYED ACTION MECHANISM
Edward J. Deutsch, Bellmore, N.Y., assignor to Fairchild Engine and Airplane Corporation, Bay Shore, N.Y., a corporation of Maryland
Filed May 17, 1957, Ser. No. 659,882
8 Claims. (Cl. 137—492.5)

This invention relates to a delayed action device for initiating a desired operation after the occurrence of a predetermined number of pressure fluctuations.

The present invention is particularly applicable for use as a safety mechanism to relieve a surge condition in a conduit for fluids. A surge condition in a fluid conduit is characterized by pressure fluctuations of increasing intensity, and unless provision is made for relieving the pressure in the fluid conduit before the pressure fluctuations become dangerously violent, damage to the fluid system may result.

The present invention provides a delayed action mechanism which is operative after a number of surges in a fluid conduit to initiate a desired operation such as, for example, opening a relief valve in communication with the fluid conduit to relieve the pressure therein. Thus, the surges of less violent intensity serve as the means for triggering the operation of the relief valve before the more violent surges have an opportunity to cause damage. The present invention includes a pressure chamber in communication with the fluid conduit through a passage containing a valve which is normally closed. Pressure surges in the conduit are detected by surge detecting means, and the surge detecting means operates in response to pressure surges in the fluid conduit to reduce incrementally the pressure within the pressure chamber. After a predetermined number of surges in the fluid conduit, the normally closed valve is opened, relieving pressure from the fluid conduit and exhausing it to the pressure chamber, thereby replenishing the supply of fluid within the pressure chamber.

For a complete understanding of the present invention, reference may be made to the detailed description which follows, and to the accompanying drawing in which the figure is a schematic representation of a mechanism embodying the present invention, shown in cross-section.

Referring to the drawing, the reference numeral 10 represents a conduit of a fluid system. The conduit may be a pressure line or a vacuum line. In the case of a pressure line, it may, for example, be the discharge line of a compressor.

A surge detector, generally designated 11, is provided to detect and count pressure fluctuations in the conduit 10. The surge detector 11 comprises a stationary housing 12 having a cylindrical bore therein and a piston 13 which is movable axially within the cylinder bore. The piston 13 is fitted loosely within the bore or, alternatively, the piston is provided with a restricted passage 53 therethrough to permit the piston to be displaced relatively to the bore. A restricted passage 14 connects the fluid conduit 10 with the interior of the housing 12 on one side of the piston, and a passage 15 connects the conduit 10 with the interior of the housing on the other side of the piston. The passage 15 contains a normally closed, spring urged valve 16. The valve 16 permits venting of the fluid from the interior of the housing 12 to the conduit 10 when the piston 13 is displaced away from the passage 14 and toward the passage 15, but it prevents flow of the fluid from the conduit into the interior of the housing. A piston rod 13a connected to the piston 13 is guided for movement in the end wall of the housing 12. The piston extends outside of the housing 12 where it is acted upon by a compression spring 17 which urges the piston 13 to the left, or toward the passage 14. Thus, following an initial pressure surge and the displacement of the piston 13 in response thereto, the piston is restored to its neutral position by the spring 17 and by the bleed of fluid across the piston 13.

From the foregoing description of the surge detector 11, it is apparent that during each pressure surge within the conduit 10, the piston 13 will be moved to the right, and intermediate each pressure surge in the conduit the piston will be returned toward the left by the spring 17. More specifically, during each pressure increase within the conduit 10, the pressure on the left side of the piston imparts motion to the piston to the right. Similarly, each decreasing pressure surge produces a greater pressure drop on the right side of the piston than on the left side thereof because of the restricted passage 14, thereby also imparting motion to the piston to the right.

During each pressure fluctuation within the fluid conduit 10, the surge detector device 11 is operative to exhaust a quantity of fluid from within the pressure chamber 20 of a pressure accumulator 21. The pressure chamber accumulator 21 has an expandable and contractable bellows 22 attached to it at one end, and the interior of the bellows 22 is in communication with the pressure chamber 20. A plate 22a is affixed to the end of the bellows, and a cam element 23 depends from the plate 22a by means of a connecting rod 24.

The upper end of the pressure chamber 20 is in communication with the interior of a valve housing 25 via a restricted passage 24. The valve housing 25 contains an exhaust port 26 which is normally closed by the valve 27, and the valve 27 is formed with an extension 27a which projects through the exhaust port 26 in position to be actuated by the end of the piston rod 13a. The valve 27 is normally urged by a compression spring 28 to the closed position, illustrated in the drawing, in which the tapered surface 27b engages and closes the inlet end of the discharge port 26. However, during each pressure fluctuation within the fluid conduit 10, the valve 27 is opened momentarily by the movement of the piston rod 13a into engagement with the extension 27a of the valve. The maximum displacement of the valve 27 to the right is defined by the engagement of the tapered surface 27c with the shoulder 27d of the valve housing 25.

It is understood that if the pressure chamber 20 has been initially charged with a fluid under pressure, the pressure within the chamber will expand the bellows 22 and maintain the cam element 23 in an extreme downwardly position. However, in the event of a surge condition in the fluid conduit 10, the piston 13 is reciprocated during each pressure fluctuation, thereby momentarily opening the valve 27. In this way, the pressure within the chamber 20 is incrementally reduced, permitting the bellows 22 to gradually contract. The contraction of the bellows 22, in turn, raises the cam element 23 in a stepwise manner so that, after a predetermined number of pressure fluctuations in the conduit 10, the cam element 23 is raised a predetermined distance to initiate a desired operation.

In the preferred embodiment of the invention, the cam element 23 connected to the bellows 22 is utilized as an actuator for a valve which operates to relieve the pressure within the conduit 10. This is achieved by permitting the cam element 23 to actuate a valve 30 which is interposed in a passage connecting the conduit 10 with the pressure chamber 20. The valve 30 is slidably mounted in a valve housing 31 which is divided by a wall 32 into chambers 33 and 34. The chamber 33 on one side of the valve is connectd by a conduit 35 with the fluid conduit 10. The chamber 34 is connected by a conduit 36 with the interior of the pressure chamber 20.

The valve opens and closes a port 37 in the wall 32,

The valve has attached to it a stem 30a which is guided for movement in a neck portion 38 formed integrally with the valve housing 31. The stem 30a carries a spring retaining disc 39 thereon, and a spring 40 supported on the stem is compressed between the disc 39 and the end of the neck portion 38. The spring 40 normally acts to urge the valve 30 to a closed position. The extreme end of the valve stem 30a carries a cam follower roller 41 which is situated in the path of movement of the cam element 23. After a predetermined number of surges or pressure fluctuations in the conduit 10, the sloped surface 23a of the cam element 23 lifts into contact with the cam follower 41, thereby moving the valve 30 to open position against the action of the spring 40. When the valve is in open position, the pressure surge within the fluid conduit 10 will be relieved by the flow of the fluid through the conduits 35 and 36 into the pressure chamber 20.

The lowermost position of the cam element 23 is determined by the engagement between the stops 45 and 46. The stop 45 is formed integrally with the base of the cam element 23, and the stop 46 is supported in the base 47. A compression spring 48 is interposed between the stops 45 and 46 to lessen the impact between the stops 45 and 46 and also to urge the cam element upwardly, thereby applying a compressive force on the bellows. The upward movement of the cam element 23 is resisted somewhat by an over-center throw spring 49. One end of the spring 49 is pivotally mounted to the cam element 23, and the other end is pivotally mounted about a fixed point 50. The spring 49 insures a snap action in the operation of the cam element 23 to open the valve 30. It also resists the expansion of the bellows 22 when the valve 30 is open so that the cam element 23 will not necessarily be restored to its initial downward position by the first pressure surge in the conduit 10.

If desired, a visual indicator may be provided to permit a person to determine the number of pressure fluctuations which have occurred in the conduit 10 or the number of pressure fluctuations before which the valve 30 will be operated. Accordingly, the cam element carries a pointer 51 which moves relative to a fixed scale 52.

The delayed action mechanism of the present invention may be utilized to check the occurrence of surge conditions before they build up to violent surge conditions. In the event of a violent surge condition, a larger blow-off valve may be utilized to prevent damage to the system.

The sensitivity of the device of the present invention may be varied by the adjustment of the compression of the spring 48 or by regulating the size of the orifice in the passage 14. The device may also be made sensitive to the frequency of the surge pulses by the inclusion of a bleed orifice through the wall 32, the frequency adjustment being made by varying the orifice size.

The invention has been shown in a single preferred form and by way of example only, and it is understood that various modifications and variations may be made therein without departing from the spirit of the invention. For example, it is apparent that the cam element 23 can be utilized to initiate other operations besides the opening and closing of the valve 30. The invention, therefore, is not to be limited to any specified form or embodiment, except in so far as such limitations are set forth in the appended claims.

I claim:

1. A delayed action mechanism comprising a pressure chamber, an inlet port through which fluid is admitted to charge the pressure chamber, a valve normally closing said inlet port, a discharge port for exhausting the pressure from said pressure chamber, a valve normally closing said discharge port, pressure fluctuation responsive means for momentary opening of the valve which closes the discharge port, thereby exhausting the pressure incrementally from the pressure chamber, a movable actuator displaced by the pressure in the pressure chamber, said actuator being movable from an initial position toward an operative position as the pressure is reduced incrementally within the pressure chamber, and means controlled by the actuator in the operative position for opening the valve which closes the inlet port, thereby recharging the pressure chamber.

2. A delayed action mechanism controlled by pressure fluctuations within a conduit comprising a pressure chamber, a movable actuator displaced by the pressure within said pressure chamber, a discharge port for exhausting the pressure from said pressure chamber, a valve normally closing said discharge port, pressure fluctuation responsive means for opening said valve during each pressure fluctuation detected in the conduit, thereby reducing the pressure within the pressure chamber incrementally to impart movement to the actuator, and means controlled by the movable actuator to recharge the pressure chamber.

3. A delayed action mechanism as set forth in claim 2 wherein the pressure fluctuation responsive means comprises a piston, a housing providing a bore for said piston, said housing and piston being movable relatively to each other by differential pressure within the housing on opposite sides of the piston, first passage means connecting the conduit with the bore on one side of the piston, second passage means connecting the conduit with the bore on the other side of the piston, and one-way valve means for controlling the flow through one of said passages, permitting flow from the housing bore to the conduit only.

4. A delayed action mechanism as set forth in claim 2 in which said means to recharge the pressure chamber includes passage means connecting the conduit and the pressure chamber, a valve normally closed to prevent flow thsough the passage means, and means operatively connecting the actuator and the normally closed valve when the pressure within the chamber has been reduced by a sufficient amount to open the normally closed valve.

5. A delayed action mechanism for relieving a surge condition in a conduit of a fluid system comprising a pressure chamber adapted to be charged with a fluid under pressure, means for detecting pressure surges in the conduit, means responsive to the detection of a pressure surge in the conduit for exhausting momentarily fluid from the pressure chamber, thereby reducing the pressure within the pressure chamber by increments, passage means connecting the pressure chamber and the conduit, a valve normally preventing flow through said passage means, and a movable actuator displaced by the pressure within the pressure chamber for opening said valve when the pressure within the pressure chamber has been substantially reduced, thereby permitting flow from the conduit to the pressure chamber to relieve the pressure within the conduit and to recharge the pressure chamber.

6. A delayed action mechanism for relieving a surge condition in a conduit of a fluid system comprising a pressure chamber adapted to be charged with a fluid under pressure, an inlet port for admitting fluid into the pressure chamber, a valve normally closing said inlet port, a discharge port for exhausting fluid from said pressure chamber, a valve normally preventing the exhaust of fluid through said discharge port, reciprocating means controlled by pressure fluctuations in the conduit for momentarily opening said valve in the discharge port during each pressure surge in the conduit, whereby the pressure in the pressure chamber is reduced in increments, an expandable and contractable bellows in communication with said pressure chamber, movable cam means controlled by the expansion and contraction of said bellows, passage means establishing communication between the conduit and the inlet port of said pressure chamber, and means controlled by said cam means for opening the valve in the inlet port when the pressure has been reduced substantially within the pressure chamber, thereby relieving the pressure in the conduit and recharging the pressure chamber.

7. A delayed action mechanism as set forth in claim 6, wherein said reciprocating means comprises a piston and a housing providing a bore for said piston, said housing and piston being movable relatively to each other by differential pressure within the housing on opposite sides of the piston, said relative movement imparting reciprocation to said reciprocating means, a passage connecting the conduit with one end of said housing bore, whereby pressure surges in the conduit produce an increase in pressure within the housing bore at one side of said piston to produce relative movement between the housing and the piston which momentarily opens the valve in the discharge port of the pressure chamber, passage means connecting the conduit with the opposite end of said housing bore, and a one-way valve for permitting the passage of fluid from the housing bore to the conduit and for preventing the pressure surges within the conduit from producing an increase in pressure within the housing bore on the opposite side of said piston.

8. A delayed action mechanism comprising a conduit for a fluid under pressure, a pressure chamber, a normally closed pressure relief valve communicating with said pressure chamber, pressure fluctuation responsive means for opening said relief valve momentarily during each pressure fluctuation detected in the conduit, thereby reducing the pressure within the pressure chamber incrementally, means defining a passage connecting the conduit and the pressure chamber, a normally closed supply valve preventing flow through said passage and means for opening said supply valve to permit flow from the conduit to the pressure chamber in response to a reduction in pressure within the pressure chamber following a plurality of pressure fluctuations within the conduit.

References Cited in the file of this patent

UNITED STATES PATENTS

| | | |
|---|---|---|
| 514,394 | Everen | Feb. 6, 1894 |
| 587,427 | Cobb | Aug. 3, 1897 |
| 2,323,839 | Nixon | July 6, 1943 |